United States Patent [19]

Sengoku

[11] Patent Number: 4,954,908
[45] Date of Patent: * Sep. 4, 1990

[54] RECORD MEDIUM CONTROL APPARATUS

[75] Inventor: Masaharu Sengoku, Amagasaki, Japan

[73] Assignee: Mitsubishi Denki Kabushiki Kaisha, Tokyo, Japan

[*] Notice: The portion of the term of this patent subsequent to Dec. 12, 2006 has been disclaimed.

[21] Appl. No.: 258,897

[22] Filed: Oct. 17, 1988

[30] Foreign Application Priority Data

Dec. 14, 1987 [JP] Japan .................. 62-317827

[51] Int. Cl.$^5$ .................. G11B 33/00; G05B 1/06
[52] U.S. Cl. .................. 360/78.04; 360/77.03; 318/632
[58] Field of Search ............ 360/69, 75, 77.03, 78.04; 369/32, 47, 44, 48; 318/632

[56] References Cited

U.S. PATENT DOCUMENTS

| | | | |
|---|---|---|---|
| 4,380,737 | 4/1983 | Sanders | 330/279 |
| 4,563,775 | 1/1986 | Yokosuka | 330/279 |
| 4,748,393 | 5/1988 | Fincher et al. | 360/78.04 |

FOREIGN PATENT DOCUMENTS 60-101777  6/1985  Japan .

OTHER PUBLICATIONS

Basics and application of automatic control by Takai and Hasegawa, pp. 245–250, 5/25/1971.
U.S. Patent application No. (Co-pending) 07/211206, filed 6/24/88 by Masaharu Sengoku.

Primary Examiner—Alan Faber
Assistant Examiner—David L. Robertson
Attorney, Agent, or Firm—Wolf, Greenfield & Sacks

[57] ABSTRACT

A storage apparatus wherein a servo mechanism of a heed for record and regeneration is provided with a gain-variable amplifier, a gain controller for varying the gain of the gain-variable amplifier, and a comparator for comparing an output of a position sensor and a reference voltage, and which detects a gain margin of the servo mechanism according to the result of the comparison and operates so as to prevent the servo mechanism from an oscillation according to the result of the detection.

3 Claims, 4 Drawing Sheets

RECORD MEDIUM CONTROL APPARATUS

BACKGROUND OF THE INVENTION

1. Field of the Invention

The present invention relates to a storage apparatus used for a computer or a peripheral equipment of a computer, and specifically relates to an improvement in a servo mechanism for controlling positioning of a head for record and regeneration.

2. Description of the Prior Art

FIG. 1 is a side view showing a general magnetic disk apparatus, for example, as described in the Japanese Patent Laid-Open No. Sho-101777/1985.

In FIG. 1, Numeral 1 designates a support bed serving as a base, and a rotary apparatus 2 consisting of a spindle motor is fixed onto the surface of the support bed 1, and a disc-shaped recording medium 3 consisting of a magnetic disk is supported by a rotary shaft 2a of the rotary apparatus 2.

Facing the lower surface (recording surface) of the recording medium 3, a head 4 for recording information on the recording surface of the recording medium 3 or for regenerating information on the recording surface of the recording medium 3 is disposed in the state of being connected to a pressure spring 5 for forcing it to the recording surface. The pressure spring 5 is supported by an arm 6 so that the end thereof on the opposite side of the head 4 is put on one end of the arm 6. The other end of the arm 6 is fixed to a carriage 8 being one of constituent members of an actuator 7 as described later. As a result, the head 4 is affected by an energizing force of the pressure spring 5 and a buoyancy generated attending on rotation of the recording medium 3, and thereby it is moved in the radial direction of the recording medium 3 integrally with the actuator 7 (carriage 8) in the state of having a minute air gap with the recording medium 3, and the position thereof is controlled. The actuator 7 is composed of a bearing 9 for guide-moving the carriage 8 on the support bed 1, a cylindrical coil 10 provided around one end of the carriage 8, a magnet 11 disposed opposite to the coil 10 and a yoke 12 for positioning the magnet 11 in addition to the carriage 8.

Numeral 13 designates a position sensor for detecting the position of the actuator 7 in the radial direction of the recording medium 3, and the position sensor 13 is composed of a converter 14 fixed on the support bed 1 and an optical linear scale 15 provided in the carriage 8.

FIG. 2 is a block diagram showing a storage apparatus wherein a control driving part is added to the magnetic disk apparatus as shown in FIG. 1.

In FIG. 2, numeral 19 designates a computer, and the computer 19 outputs a movement-positioning command to a servo circuit 17, and outputs a record command or a regeneration command to a read/write circuit 18. Being inputted the movement-positioning command from the computer 19, the servo circuit 17 inputs positional information from the position sensor 13 and positioning speed information from a speed demodulator 16 for detecting the positioning speed of the head 4 by differentiating and shaping the positional information from the position sensor 13, and drives the actuator 7 to set the head 4 in a proper position according to these information.

Being inputted a record command or a regeneration command from the computer 19, the read/write circuit 18 writes information on the recording medium 3 through the head 4, or reads out information from the recording medium 3.

Next, description is made on operation of the storage apparatus having such a configuration.

When the recording medium 3 is rotated attending on rotation of the rotary apparatus 2, the buoyancy is generated in the head 4 by a viscous air flow over the surface of the recording medium 3. The buoyancy is balanced against the energizing force of the pressure spring 5, and thus the recording medium 3 rotates while having the minute air gap with the head 4.

When a movement-positioning command is outputted from the computer 19 to the servo circuit 17, a current flows through the coil 10, and a force according to the Fleming's left-hand law acts on a magnetic circuit composed of the magnet 11 and the yoke 12. Then, the carriage 8 is driven in the radial direction of the recording medium 3, and the head 4 is moved to be positioned while making seek operation on information tracks arranged in the radial direction at predetermined intervals on the concentric circles of the recording medium 3. At this time, the servo circuit 17 positions the head 4 at a command position according to the positional information from the position sensor 13.

After completing movement-positioning of the head 4, a record command or a regeneration command is outputted from the computer 19 to the read/write circuit 18, and the head 4 records information on the recording medium 3, or regenerates information from the recording medium 3.

In addition, positioning of the head 4 is performed by a servo mechanism composed of the servo circuit 17, the actuator 7, the position sensor 13 and the speed demodulator 16 according to a general theory of automatic control.

It is well known that a gain margin of several dB is required for a stable operation of the servo mechanism. In the conventional storage apparatuses, the actuator 7 and the positions sensor 13 are configured by assembling machine parts therewith, and therefore a mechanical resonance generated due to deviations in parts or in assembling them makes no gain margin left, and resultingly the servo mechanism becomes unstable and causes an oscillation, and thus there has been a problem that positioning of the head 4 cannot be made.

SUMMARY OF THE INVENTION

The present invention has been achieved to solve the conventional technical problem, and an object thereof is to provide a storage apparatus wherein a servo mechanism is provided with a gain-variable amplifier, a gain controller for varying the gain of said gain-variable amplifier, and a comparator for comparing an output of a position sensor and a reference voltage, and the servo mechanism can be prevented from an oscillation by detecting the gain margin of the servo mechanism from the result of the comparison by the comparator.

The above and further objects and features of the invention will more fully be apparent from the following detailed description with accompanying drawings.

DESCRIPTION OF THE PREFERRED EMBODIMENTS

Hereinafter, specific description is made on the present invention with reference to drawings showing an embodiment thereof.

Figure 1:
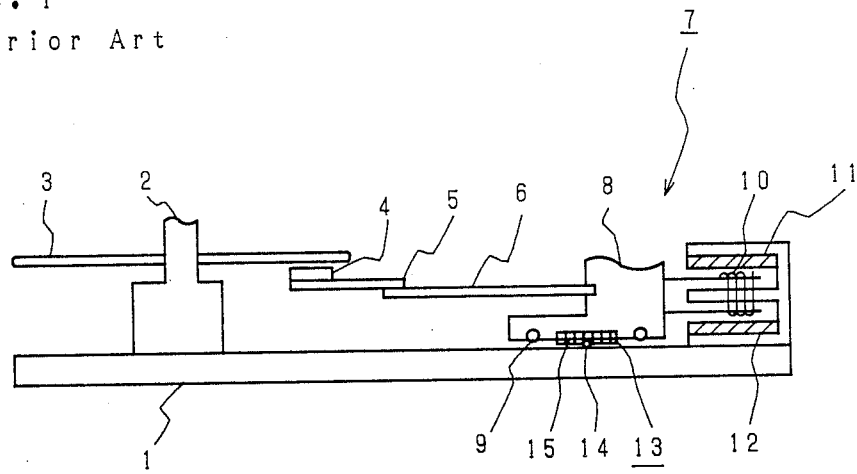
FIG. 1 is a side view showing a general magnetic disk apparatus.
Figure 2:
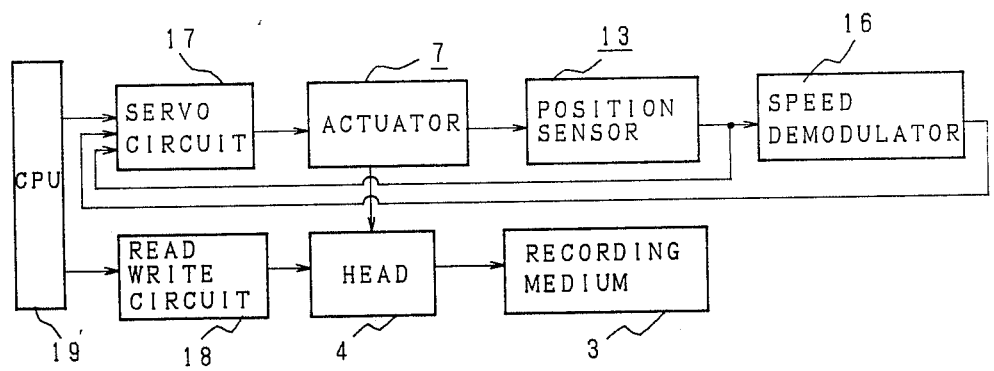
FIG. 2 is a block diagram showing a configuration of a conventional storage apparatus.
Figure 3:
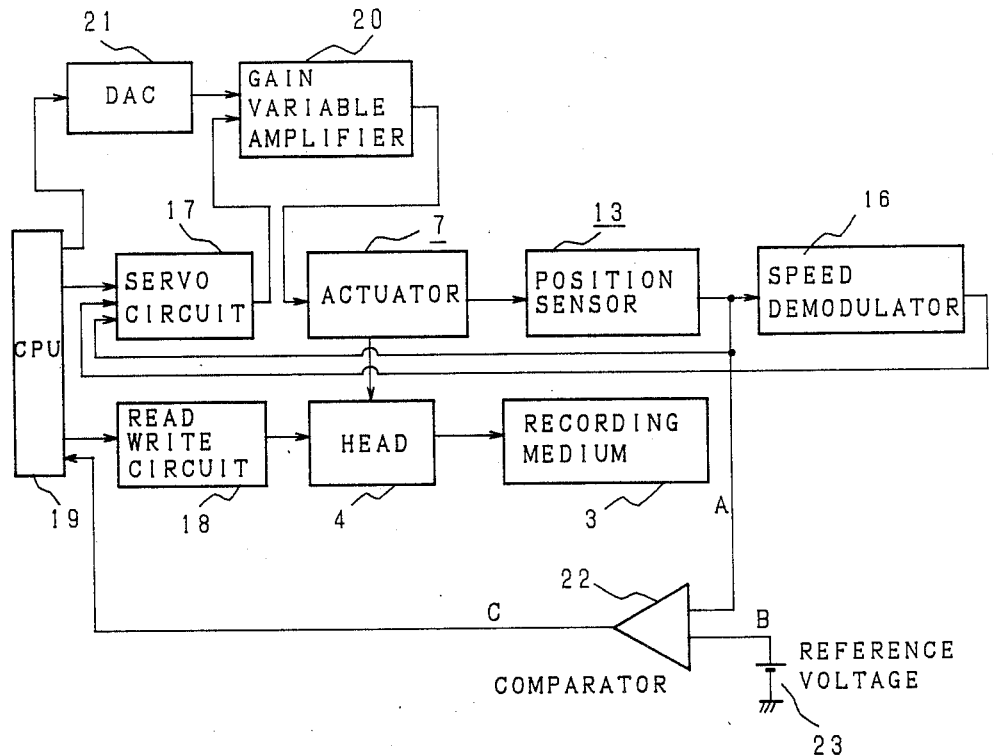
FIG. 3 is a block diagram showing one embodiment of a storage apparatus in accordance with the present invention.

FIG. 3 is a block diagram showing a configuration of one embodiment of a storage apparatus in accordance with the present invention, and in the figure, the same parts as those in FIG. 1 or FIG. 2 are designated by the same numerals. Also, configurations of portions not illustrated here are the same as the configurations shown in FIG. 1, and the description thereon is omitted here.

In a storage apparatus in accordance with the present invention, a digital-analog converter 21 (hereinafter referred to as DAC) is connected to a computer 19, and a gain-variable amplifier 20 whose gain of amplification is variable is disposed between a servo circuit 17 and an actuator 7. A predetermined value of command is given from the computer 19 to the DAC 21, and an output from the DAC 21 is sent to the gain-variable amplifier 20, and the gain of amplification is varied based on the output from the DAC 21.

An output A from a position sensor 13 is inputted to a comparator 22, and is compared with an output B from a reference voltage 23 by the comparator 22, and when the output A is higher than the output B, an output C from the comparator 22 is sent to the computer 19.

Figure 4:
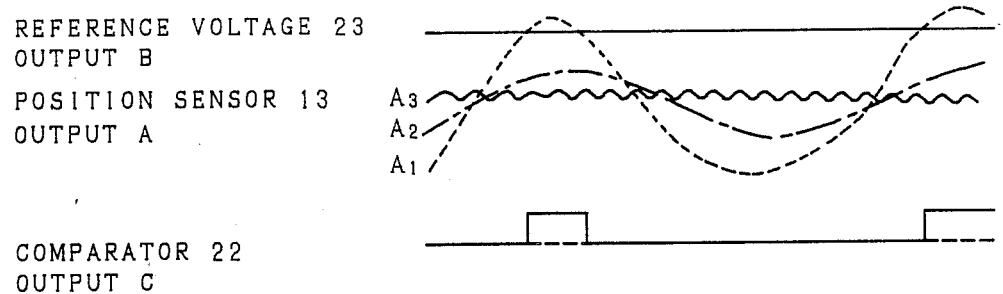
FIG. 4 is a waveform graph for explaining operation of the storage apparatus of the present invention as shown in FIG. 3.

FIG. 4 is a waveform graph showing waveforms of the output A of the position sensor 13, the output B of the reference voltage 23 and the output C of the comparator 22, and in the figure, an output $A_1$ shown by a broken line indicates the case where an oscillation takes place due to a lack of gain margin of the servo mechanism, an output $A_2$ shown by a dash-dot line indicates the case where the gain of the servo mechanism has a small margin, and an output $A_3$ shown by a full line indicates the case where the gain of the servo mechanism has a margin of several dB, respectively.

In addition, it is the same as in the case of the conventional storage apparatus that the servo circuit 17 receives a positioning command from the computer 19, and drives the actuator 7 to position a head 4 properly according to positional information from the position sensor 13 and speed information from a speed demodulator 16 except that a drive signal from the servo circuit 17 is inputted to the actuator 7 through the gain-variable amplifier 20. Also, it is the same as in the case of the conventional storage apparatus that after completing movement-positioning of the head 4, a read/write circuit 18 receives a record command or a regeneration command from the computer 19, and the head 4 records information on the recording medium 3 or regenerates information from the recording medium 3.

Next, description is made on operation of the storage apparatus of the present invention as shown in FIG. 3 using the waveform graph in FIG. 4.

Normally, the computer 19 gives a predetermined value of command to the DAC 21 to set the gain of the gain-variable amplifier 20 to a normal predetermined value, and the output A of the position sensor 13 has a stable waveform as shown by $A_3$ in FIG. 4. When a predetermined value of command larger than said predetermined value of command is given from the computer 19 to the DAC 21 so as to change an output thereof, and the gain of the gain-variable amplifier 20 is raised, the servo mechanism having a small gain margin is put in an unstable state and starts to oscillate, and the output A of the position sensor 13 has an oscillation wave-form as shown by $A_1$ in FIG. 4, the voltage goes higher than the output B of the reference voltage 23, and the output C of the comparator 22 is generated.

The servo mechanism having a larger margin of gain becomes rather unstable, but the output A of the position sensor 13 has a waveform of oscillation as shown by $A_2$ in FIG. 4, and is lower than the output B of the reference voltage 23 so that the output C can not be generated.

Accordingly, the computer 19 is capable of discriminating the magnitude of gain margin of the servo mechanism according to the presence or absence of the output C from the comparator 22 responding to the command value issued to the DAC 21.

In addition, the difference between the large predetermined command value and the normal predetermined command value is set in advance so as to correspond to several dB of gain margin of the servo mechanism.

In the above-mentioned embodiment, a configuration is adopted such that the magnitude of gain margin of the servo mechanism is discriminated by the computer 19, in addition to this, another configuration may also be adopted that the magnitude of gain margin is discriminated by an electric circuit or a microcomputer disposed inside the magnetic disk apparatus, the controlling apparatus or the like.

The carriage 8 is moved in a line so as to position the head 4 in the embodiment, however, another driving ways such as rolling or rotary movement may be selected to position the head 4.

Also, in the embodiment, a configuration is adopted that the position of the head 4 is detected by the position sensor 13, but another configuration may also be adopted that the position thereof is detected by the head 4 itself or another head.

Furthermore, in the embodiment, description is made on the storage apparatus using the magnetic disk apparatus, but needless to say, the similar configuration can also be applied to the storage apparatus employing an optical system, optomagnetic system, laser system, electric field system, electric charge system or the like.

As described above in detail, in the storage apparatus in accordance with the present invention, the margin of the gain characteristic of the servo mechanism can be detected in advance. Accordingly, the servo mechanism can be prevented from becoming unstable and generating an oscillation or from becoming incapable of positioning the head, and thus position the head properly at all times.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A storage apparatus comprising,
   a head which records information on a recording medium, or regenerates information from the recording medium;
   a servo mechanism having a position sensor for detecting the position of said head, an actuator for moving said head, and a servo circuit for driving said actuator to set said head to a proper position in response to an output signal from said position sensor;
   a gain-variable amplifier disposed between said servo circuit and said actuator;
   a gain controlling means for outputting a signal for varying the gain of amplification of said gain-variable amplifier;
   a reference voltage generating means for generating a reference voltage;
   a comparator which compares said reference voltage with the output signal of said position sensor; and
   a gain margin detecting means for detecting a gain margin of said servo mechanism in response to a variance in an output signal of said comparator in varying the gain of amplification of said gain-variable amplifier,
   wherein said gain controlling means comprises a computer which outputs a positioning command to said servo circuit and outputs a read/write command to said head.

2. A storage apparatus as set forth in claim 1, wherein said computer outputs a predetermined signal for setting the gain of amplification of said gain-variable amplifier to a normal value, and a signal for changing the gain of amplification by several dB larger than said normal value.

3. A storage apparatus comprising,
   a head which records information on a recording medium, or regenerates information from the recording medium;
   a servo mechanism having a position sensor for detecting the position of said head, an actuator for moving said head, and a servo circuit for driving said actuator to set said head to a proper position in response to an output signal from said position sensor;
   a gain-variable amplifier disposed between said servo circuit and said actuator;
   a gain controlling means for outputting a signal for varying the gain of amplification of said gain-variable amplifier;
   a reference voltage generating means for generating a reference voltage;
   a comparator which compares said reference voltage with the output signal of said position sensor; and
   a gain margin detecting means for detecting a gain margin of said servo mechanism in response to a variance in an output signal of said comparator in varying the gain of amplification of said gain-variable amplifier,
   wherein said gain margin detecting means comprises a computer which outputs a positioning command to the servo circuit and outputs a read/write command to said head.

* * * * *